United States Patent [19]
Bertolini

[11] 3,767,255
[45] Oct. 23, 1973

[54] CHASSIS WITH LOCKING DEVICE

[75] Inventor: William A. Bertolini, Kinnelon, N.J.

[73] Assignee: Bertolini Engineering Co., Inc., Kinnelon, N.J.

[22] Filed: Oct. 31, 1972

[21] Appl. No.: 302,615

Related U.S. Application Data

[62] Division of Ser. No. 181,921, Sept. 20, 1971.

[52] U.S. Cl. .......... 296/35 A, 24/221 R, 105/366 B, 248/361 R
[51] Int. Cl. ............................ B60p 1/64, B65j 1/22
[58] Field of Search ............... 296/35 A; 105/366 B, 105/366 A, 366 D; 248/361 R; 24/221 R

[56] References Cited
UNITED STATES PATENTS

| | | | |
|---|---|---|---|
| 3,027,025 | 3/1962 | Tantlinger | 296/35 A |
| 3,204,579 | 9/1965 | Burns et al. | 105/366 B |
| 3,444,824 | 5/1969 | Gutridge | 105/366 B |
| 3,521,845 | 7/1970 | Sweda | 105/366 B |

Primary Examiner—Leo Friaglia
Assistant Examiner—John A. Pekar
Attorney—Joel S. Goldhammer et al.

[57] ABSTRACT

A 90° rotatable lock member is disclosed for releasably locking a container to the bolster of a chassis. The lock member shank has upper and lower bearing supports and is provided with an offset captive, but removable, handle. The handle has open and closed positions and is spring-biased into niches defining each of said positions for the handle.

5 Claims, 4 Drawing Figures

CHASSIS WITH LOCKING DEVICE

This application is a division of my copending patent application Ser. No. 181,921 filed on Sept. 20, 1971 and entitled LOCKING DEVICE.

The locking device of the present invention affords a true 90° lock which allows for the maximum area of retention to provide certainty and safety in the coupling of the container to the chassis. The locking device includes a lock member having an extra long shank rotatably supported about an upright axis and guided with bearing surfaces at two spaced points along the shank. The provision of two bearing support surfaces provides for strength and stability in the lateral and longitudinal directions. The lock member is preferably cast with a retaining pin hole and a handle slot so as to require no machining.

The lock member is rotatably mounted on a collar which is preferably of cast steel and of annular configuration. In this manner, the collar may be welded to the bolster in at least two places and thereby provide more than sufficient strength to carry loads or forces imparted thereto due to shifting of the container. The annular configuration of the collar enables it to extend into a hole in the bolster top plate and thereby accurately locate the lock member and to supplement retention of the lock member in a proper location.

The lock member is selectively rotated between operative and non-operative positions by means of an offset handle. The handle is preferably captive in that it remains with the lock mem-ber. The handle is preferably spring-biased into one of two niches which define the operative and inoperative positions for the lock member. The spring assures retention even under dynamic conditions and is preferably of non-corrosive stainless steel construction. In the open disposition of the lock, the handle remains substantially within the confines or dimensions of the chassis or container. This feature assures that no damage from handling equipment such as straddle carriers or forklift trucks can occur even when the handle is in its open position. The captive nature of the handle minimizes maintenance while at the same time is capable of being replaced in the field without the need for special tools or equipment.

Thus, the locking device of the present invention has features and advantages of simplicity, safety, low maintenance, strength and stability, and is relatively inexpensive while having minimum assembly costs.

It is an object of the present invention to provide a chassis having a novel locking device of the character described above.

For the purpose of illustrating the invention, there is shown in the drawings a form which is presently preferred; it being understood, however, that this invention is not limited to the precise arrangements and instrumentalities shown.

Figure 1:
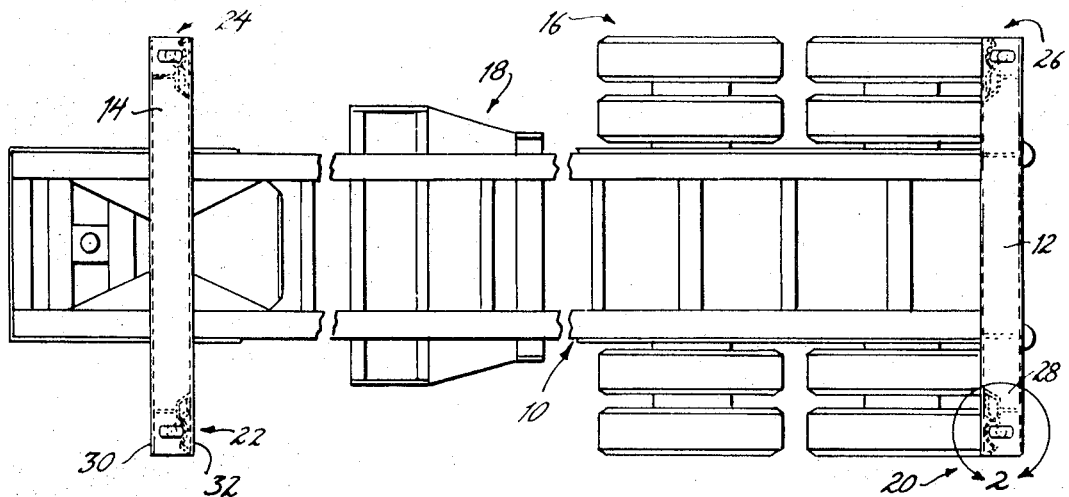
FIG. 1 is a plan view of a chassis on which a container is to be coupled at the corner castings of the container by means of the locking device of the present invention.

Referring to the drawing in detail, wherein like numerals indicate like elements, there is shown in FIG. 1 a chassis designated generally as 10. The chassis supports bolsters 12 and 14 as illustrated. The chassis is mounted on tandem rear wheels and is provided with a forwardly disposed vertically adjustable landing gear 18.

Removable containers are known and have standard corner castings. The bolsters on the chassis 10 include locking devices 20, 22, 24, and 26, each adapted to be utilized for coupling one corner casting of a container to the bolster on the chassis. Each of the locking devices 20-26 is identical, except for righthand and lefthand configurations. Hence, only locking device 20 will be described in detail.

Figure 2:
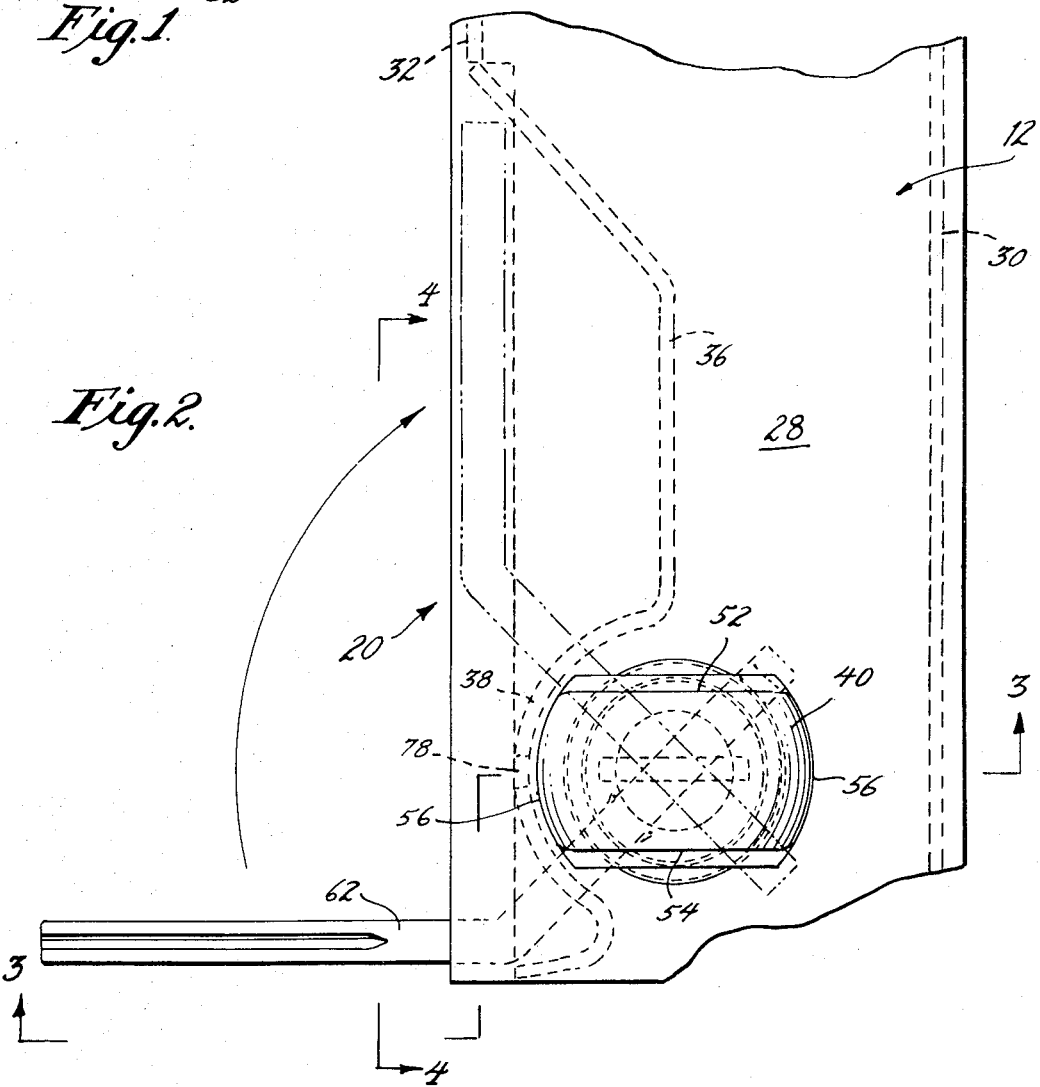
FIG. 2 is an enlarged detail view of a portion of FIG. 1.
Figure 3:
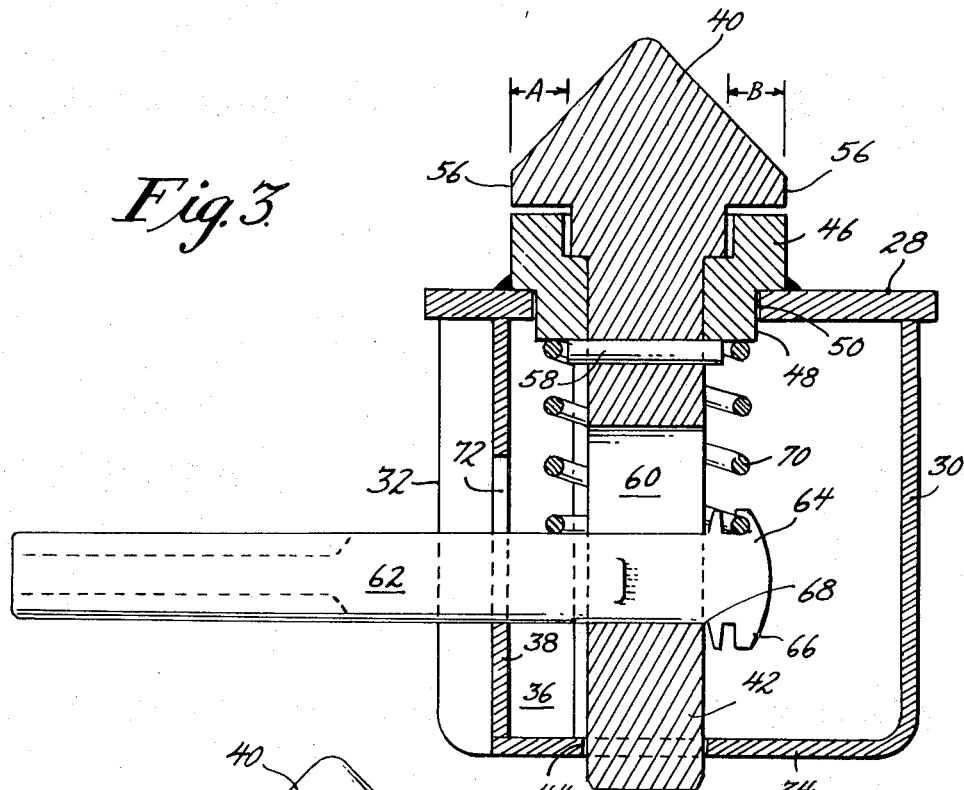
FIG. 3 is a sectional view taken along the line 3—3 in FIG. 3.

The locking device 20 as shown in FIG. 1 is reproduced on an enlarged scale in FIG. 2. Referring to FIGS. 2 and 3, it will be noted that the bolster 12 includes a top plate 28 secured in any convenient manner, such as welding, to the upper edge of side walls 30 and 32. The lower edge of walls 30 and 32 is interconnected by an integral one-piece bottom wall 34. A portion of wall 32 has been removed and replaced by a detent plate 36 having a curved portion 38. The ends of the bolster 12 are open, for access to internal components.

The locking device 20 includes a lock member 40 having an integral shank 42. The shank 42 is of a length greater than the distance between the top plate 28 and the bottom wall 34 of the bolster 12. Shank 42 extends through a hole 44 in wall 34 which constitutes a first bearing guide surface for the shank 42.

A collar 46 having an annular bearing portion 48 is shown. A hole 50 is pierced through the top plate 28 so that the hole 50 is coaxial with hole 44. The diameter of hole 50 is greater than the diameter of hole 44. Bearing portion 48 extends through hole 50. Shank 42 extends through the collar 46 with the bearing portion 48 forming a second bearing surface for the shank 42. Hence, shank 42 is guided by bearing surfaces adjacent each of its ends.

The head of the lock member 40 is cast or otherwise machined so as to have flats 52 and 54 on opposite faces thereof. See FIGS. 2 and 4. Between the flats, and adjacent the collar 46, the head of the lock member 40 is provided with curved surfaces 56 which are arcs of a circle. The radius for the surfaces 56 is greater than the radius of hole 50 and is likewise greater than the corresponding radial dimension across the flats 52 and 54.

The collar 46, at an elevation slightly above the elevation of plate 28, is provided with flats 51, 53, corresponding to the flats 52 and 54. See FIG. 4. The distance between the flats 51, 53 and the periphery of the curved surfaces 56 will result in an overhang on opposite ends of the head of the lock member 40 for overlying a portion of the corner casting on the container. The amount of this overhang on opposite ends of the head of the lock member 40 is designated as A and B in FIG. 3.

The shank 42 is cast or otherwise provided with a hole adapted to receive a locking pin 58. The length of locking pin 58 is less than the diameter of the bearing portion 48 on the collar 46. See FIG. 3. If desired, the shank 42 may be preassembled to extend through the collar 46 and the pin 58 positioned to extend through the shank 42 before the collar 46 is welded to the top plate 28. Due to the fact that the bearing portion 48 on collar 46 has a close fit with the hole 50, the locking devices may be accurately positioned on the bolsters so as to properly cooperate with the corner castings on the container. Collar 46 is preferably welded to top plate 28 on opposite sides thereof to provide the desired strength and rigidity.

The shank 42 of the lock member 40 is preferably cast with a slot 50 therein. An offset handle 62 extends through the slot 60 and terminates in jaws 64 and 66 on opposite sides of the handle. Each of the jaws is defined by curved surfaces so as to define a fulcrum 68 to facilitate upward pivoting of the handle 62. In FIG. 3, the jaws 66 facilitate the provision of fulcrum 68. When used on the opposite side of the bolster, jaws 66 will embrace the spring. The extended portion of the jaws also locks the handle in place under spring pressure preventing its removal without compressing the spring. The provision of jaws on opposite sides of the handle enables a single handle to be utilized on opposite sides of the chassis and thereby avoids the need for a righthand handle and a lefthand handle.

A helical expansion spring 70 surrounds the shank 42. One end of the spring 70 abuts the lower surface on the bearing portion 48 of the collar 46. The other end of the spring 70 extends into jaw 64 and biases the handle 62 to the lower end of the slot 60. The length of locking pin 58 is shorter than the inner diameter of the spring 70. Locking pin 58 is the only element which retains the lock member 40 in assembled relationship with the coupler 46. If locking pin 58 is loosened due to vibration, it will be prevented from complete withdrawal from the shank 42 by contact with the inner periphery of the spring 70. Thus, in order to remove the locking pin 58, it will be necessary to remove the handle 62 and permit the spring 70 to descend to the lower end portion of the shank 42.

Figure 4:
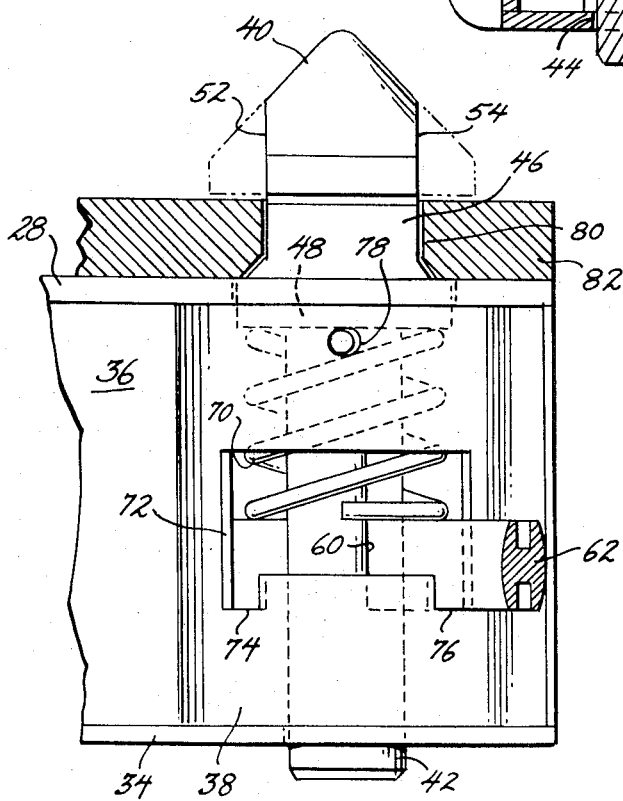
FIG. 4 is a side elevation view taken along the line 4—4 in FIG. 2.

Referring to FIG. 4, it will be noted that the curved portion 38 on the detent plate 36 is provided with a slot 72 having spaced niches 74 and 76 at opposite ends of the slot. The niches 74 and 76 define the open and closed disposition for the handle 62. Spring 70 biases the handle 62 into one of the niches 74, 76.

The locking device of the present invention is utilized as follows: The handle on each locking device 20, 22, 24 and 26 is manually manipulated to the open position such as that shown in solid lines in FIG. 2. This will result in the flats 52 and 54 on each of the lock members 40 to be aligned with and directly above the flats on the respective collars 46. A container will be manipulated to a position over the chassis so that the lock member 40 on each locking device extends upwardly through a slot 80 of the same general configuration in each corner casting 82 on the container. The closed position for member 40 is shown in phantom in FIG. 4. Thereafter, each handle 62 will be rotated 90° to its closed position to secure each corner casting on the container to one of the bolsters 12 and 14 on chassis 10.

As handle 62 is moved from its open position to its closed position, it is first pivoted upwardly about the fulcrum 68. This compresses the spring 70 and permits the handle 62 to be moved upwardly out of the niche 76. Thereafter, rotation of the handle 62 toward the niche 74 rotates the lock member 40 and its shank 42. When the handle 62 is above the niche 74, it may be released and the spring 70 will bias the handle 62 downwardly into niche 74. Such rotation of the lock member 40 will result in the ends of the lock member 40 overlapping surfaces on the container corner castings by an amount corresponding generally to the distances designated A and B in FIG. 3. The distances A and B represent the difference in radius between the curved surfaces 56, the radial dimensions of flats 52 and 54, all with respect to the longitudinal axis of shank 42.

The detent plate 36 provides sufficient space behind the handle 62 so that it may be grasped by the hands of an operator. In the open disposition of the handle 62, it remains within the permissible limits for the length of the bolster and thereby does not extend out beyond the ends of the bolster where it could be contacted by a forklift truck or some other material handling apparatus. The cooperation between the handle 62 and the spring 70 minimizes maintenance and prevents the handle 62 from being inadvertently lost.

The locking device may be readily disassembled in the field without any special tools. Using only one's hands, the spring 70 may be raised upwardly so as to disengage spring 70 from the jaws 64 and thereby permit removal of the handle 62. Thereafter, the spring 70 will descend to the lower end of the shank 42. Thereafter, a screwdriver may be extended to a position to push pin 58 out of its hole in the shank 42. If desired, the curved portion 38 of the detent plate 36 may be provided with a hole 78 which is aligned with the pin 58 when the lock member 40 is in its open disposition. Hole 78 will facilitate extending a screwdriver therethrough so as to push out the pin 58. Thereafter, the lock member and the shank 42 may be raised vertically and removed.

Thus, it will be seen that the locking device of the present invention involves a minimum number of parts while at the same time providing for low maintenance, simple and safe operation, with maximum strength and stability. The annular configuration of the collar 46 with welds on opposite sides to the top plate 28 contributes to the overall strength and stability of the locking device while minimizing potential damage to the locking device by unskilled operators.

The locking device of the present invention may be made from a wide variety of materials. In order to assure for long life, the lock member 40 and its shank 42 are preferably made of heavy cast steel or iron. The spring 70 and the pin 58 are preferably made from stainless steel.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a chassis, a bolster on said chassis, said chassis being mounted on wheels at at least one end thereof, said bolster having first and second aligned holes with the first hole being above the elevation of the second hole, a locking device, said locking device having an annular collar fixedly secured to said bolster at said first hole, a rotatable lock member supported above said collar, said lock member having a shank extending through said collar and into the second hole to thereby provide two bearing surfaces for said shank, a handle having one end coupled to the shank for rotating said member through an arc of 90°, said shank having a slot therethrough, said handle having a portion at one end which extends through said shank slot, a spring surrounding said shank, said spring biasing said handle in a direction along the shank away from said collar, and each of said lock member and collar having at least one flat thereon.

2. Apparatus in accordance with claim 1 wherein said chassis has first and second bolsters adjacent opposite ends thereof, each bolster being generally perpendicular to the longitudinal axis of the chassis, and each end of said bolster containing said locking device.

3. Apparatus in accordance with claim 1 wherein said bolster includes a wall having a slot therein, said wall slot having first and second niches defining the operative and inoperative positions of said locking member, said handle extending through said wall slot and being biased into one of said niches by said spring.

4. Apparatus in accordance with claim 3 wherein said handle is generally perpendicular to said bolster in one operative position of said locking member, said wall having a detent for receiving said handle in the other operative position of said locking member.

5. Apparatus comprising a chassis bolster, a locking device supported by said bolster, said bolster having a top plate having a hole therein, said locking device including a collar affixed to the top plate and extending through the hole, a rotatable lock member supported by the collar, said lock member having a slot therethrough, a handle having one end extending through the slot for rotating said lock member through an arc of 90°, said slot being on a shank portion of the lock member and being elongated in an axial direction of the shank, a spring surrounding said shank, said spring biasing said handle in an axial direction along the shank away from the collar, said handle being removable from the shank slot by an upward movement compressing said spring, said shank being vertically disposed, said handle having an upwardly facing notch receiving a portion of said spring, and said lock member having a dimension transversely greater than the corresponding dimension of said collar in one rotative disposition of said lock member.

* * * * *